United States Patent [19]

Lewis

[11] 4,192,606
[45] Mar. 11, 1980

[54] COMBINATION COPY MACHINE AND MICROFILM CAMERA

[76] Inventor: Bernard Lewis, 2049 S. Ocean Dr., Hallandale, Fla. 33009

[21] Appl. No.: 934,095

[22] Filed: Aug. 16, 1978

[51] Int. Cl.² ............................................. G03B 27/52
[52] U.S. Cl. ...................................... 355/40; 354/105
[58] Field of Search .................... 355/40, 43, 18, 112, 355/14, 46, 64, 65; 354/105

[56] References Cited

U.S. PATENT DOCUMENTS

| | | | |
|---|---|---|---|
| 2,737,095 | 3/1956 | Simjian | 355/40 X |
| 2,980,223 | 4/1961 | Stidham | 355/43 X |
| 3,377,913 | 4/1968 | Grant, Jr. | 355/46 X |
| 3,722,997 | 3/1973 | Mendoza | 355/40 X |
| 3,739,698 | 6/1973 | De Vries | 354/105 |
| 3,759,611 | 9/1973 | O'Connell et al. | 355/43 |
| 3,773,419 | 11/1973 | Sumner et al. | 355/46 X |
| 4,029,414 | 6/1977 | Rubenstein | 355/40 X |

Primary Examiner—Richard A. Wintercorn
Attorney, Agent, or Firm—Malin & Haley

[57] ABSTRACT

A device for use in conjunction with a copying machine to allow the owner of the copy machine to ascertain instantly each copy made on a particular machine, the date the copy was made and time of the day. The device includes a camera mounted optically in communication with the copy holder, a camera lens adjustment to accommodate standard and legal size microfilm photographs, a display for date, time, and frame member optically positioned in the camera field, and a switching circuitry for driving the camera one frame at a time relative to the print actuation of the copy machine. The camera is connected to be activated only when the initial print button is selected on the copy machine. Once a photograph has been taken, the camera will move to the next frame and await the next pressing of the copy machine print button. The device may be used to simultaneously make copies of a particular file while at the same time providing a storage copy on microfilm. More importantly, the device allows the copy machine owner to preserve a dated and chronologically numbered microfilm record of each copy made on the machine. The camera unit is hidden within the copy machine and may be locked to require a key for removal of the camera. An instant print film in a cassette may be utilized so that at any given moment the film would be available for determining a particular copy.

4 Claims, 1 Drawing Figure

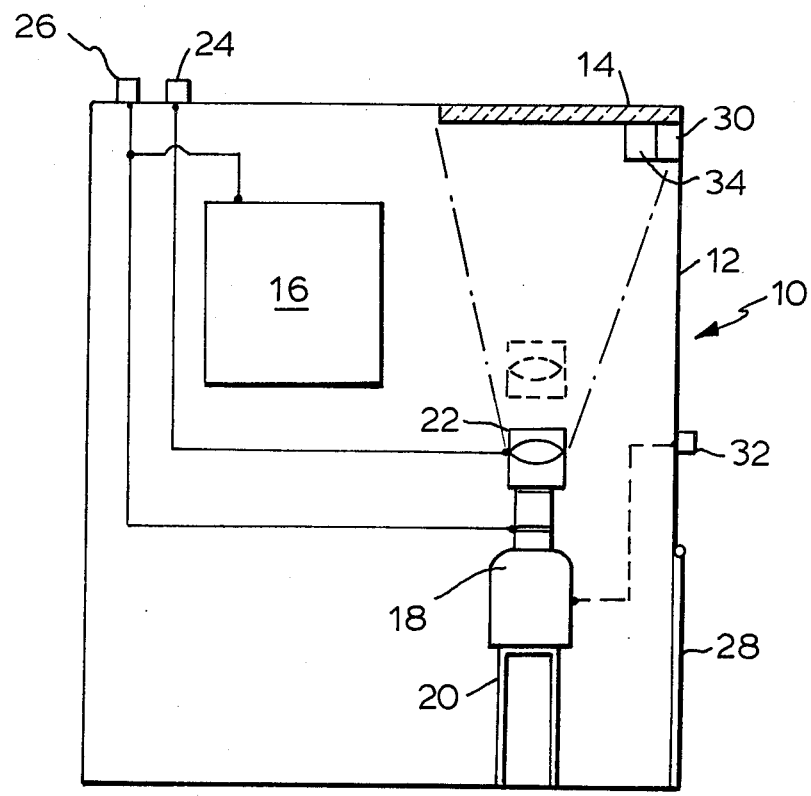

COMBINATION COPY MACHINE AND MICROFILM CAMERA

BACKGROUND OF THE INVENTION

This invention relates to a system for monitoring and recording on microfilm every copy made on a copy machine.

One of the problems with a present day copy machine is that often times, especially in large offices, personnel utilize the copy machine for their own personal use, and as such are not held accountable for copies made. Another problem is that copy machines today have the disadvantage of providing for reproduction of confidential, secret or other documents by unauthorized persons, without any way of ascertaining whether copies of such have been made. Thus, even inside personnel who have access to particular files may make copies and remove the copies surreptitiously. If inside personnel are making copies which are not authorized, it is very difficult to determine what specific documents have been copied. Another problem in record keeping today is that file copies are often made which ultimately need to be microfilmed for final storage purposes. This requires going through each file and individually microfilming each page in the file for accurate record storage. The present invention overcomes the problems found in the prior art by providing a copy machine with a camera that is securely locked in the housing of the machine that keeps a microfilm record of each document copied on the machine. The microfilm frame copy may also include the chronological number of each frame, the time, and date that the copy was made which can aid in tracing an unauthorized user.

BRIEF DESCRIPTION OF THE INVENTION

A device for installation in a copy machine that is used for duplicating copies of printed matter, the device including a camera capable of taking single frame microfilm photographs of each document as copied by the copy machine. The device includes a camera capable of taking single frame microfilm photographs which is suitably mounted within the housing of the copy machine to provide optical communication with the document mounting tray of the copy machine, which mounts a specific document to be copied. The camera also includes a moveable lens for adjusting the focal length of the camera such that it can take a microfilm photograph of either a legal or standard sized document. An appropriate switch, which operates in conjunction with the copy machine that provides for legal or standard size paper, would position the lens in the proper position for the respective size copy, the photograph of which is being taken. Also mounted within the housing of the copy machine is a battery operated digital date, time, and frame center display which is positioned in the camera's field of vision so that as a particular photograph is being made, the date, the time, and a frame number will be disposed on the film, thus providing a chronologically numbered record of each specific document copied on the machine, on microfilm. Since the time display is secured within the copy machine housing and is battery operated, a power failure will not cause incorrect time to be displayed.

As there are various different models of copy machines, the device is adaptable for addition to most present day machines or may be initially constructed in the machine as part of the original equipment.

In one embodiment, the camera may be of the cassette instant film or instant print type whereby the user may remove and determine at any time exactly what document or documents have been copied. A separate switch may be employed to use the microfilm camera alone, bypassing the copy machine operation.

It is an object of this invention to provide a conventional copy machine with a microfilm camera to record and store on film a copy of each document copied on the copy machine.

It is another object of this invention to provide a copy machine having a microfilm camera securely affixed thereto which allows for a time, date, and number film record of each original copy made on the copy machine.

And yet still another object of this invention is to allow one to police copies made on a conventional copy machine.

BRIEF DESCRIPTION OF THE DRAWINGS

The drawing shows a schematic diagram of the instant invention.

PREFERRED EMBODIMENT OF THE INVENTION

Referring now to the drawing, the instant invention is shown generally at 10 to include a conventional copy machine housing 12 having a document holder 14 which is normally a transparent surface shown mounted on the top of the machine housing 12. Element 16 denotes the conventional copy equipment mounted within the machine to accomplish copying of a document placed on the document holder 14. The operation of the copy machine per se does not form a part of this invention. A microfilm camera 18 is mounted within the housing 12 and shown on a support member 20 such that the camera and a moveable lens 22 are an optical communication with the document holder 14. The copy machine print switch 26 is used to activate both the copy machine and the microfilm camera 18 simultaneously. The camera 18 is designed to take a single frame picture each time the copy machine print button 26 is activated. A separate camera activating switch 32 is shown which can bypass the operation of the copy machine to allow one to take microfilm photographs only of a document placed on document holder 14 without actuating the operation of the copy machine itself.

To allow the microfilming of either legal or standard size documents, the lens 22 is moveable by the actuation of the paper selector switch 24 which on some copy machines is utilized to select either legal or standard size paper. The positioning of this switch 24 will determine the relative position of lens 22 relative to the document holder 14 and the camera 18 such that the focal length of the camera 18 can be adjusted to take the proper size photograph of the document positioned on the document holder 14.

Positioned within the optical field of view of the camera 18 (whether on legal or standard size operation) plus is a digital display 30 which shows both time and date and a frame counter and display 34 for recording a frame number for each different frame. The display 30 includes the timing mechanism and is battery powered such that interruptions in the normal power source will not interfere with the keeping of proper time of the display 30. The counter and display 34 is conventional and may be coupled to the camera such that as the film advances to the next frame, the counter display 34 increases by one number.

The copy machine housing 12 includes an access door 28 which includes a lock (not shown) which may be key actuated to provide access to camera 18.

In the preferred embodiment the camera 18 would be selected to utilize instant print film in a cassette or cartridge that may be readily removed at any point in time to ascertain what particular copy has been made.

In operation, whenever the print button of the copy machine 26 is actuated, the microfilm camera 18 will take a photograph of the document placed in the display tray 14. Each time the print button is actuated, the camera 18 would advance a single frame taking a photograph of the document in the tray or document holder for each separate copy made. On most conventional copy machines even if multiple copies of a single document are made the initial print button is pushed once for a particular document.

With the addition of camera activating switch 32 which bypasses the normal operation of the copy machine the device may be utilized as a microfilm recorder only.

Although many conventional copy machines vary greatly in their internal structure, the present invention may be adapted to most present day machines by installation or modification at the factory and in some instances by insertion in machine as it presently exists.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device for providing a microfilm copy of each document copied on a conventional copy machine and attachable thereto, comprising:
    a conventional copy machine including a housing;
    a camera, the camera mounted within said copy machine housing and disposed in optical communication with the document holder of said conventional copy machine; and
    a means for driving said camera for single frame photography connected to the means for actuating the copy machine such that whenever the copy machine is actuated a single frame microfilm photograph will be taken.

2. A device as in claim 1, including a means connected to said camera for taking microfilm photographs of either legal or standard size documents placed in said conventional copy machine document holder.

3. A device as in claim 2, including a means for displaying time and date disposed within said copy machine housing and within the camera optical field of view such that whenever a microfilm photograph is taken the time and date will be displayed on the microfilm.

4. A device as in claim 2, including a means for counting and displaying each microfilm frame number disposed within the camera optical field of view such that whenever a microfilm photograph is taken, a different chronological number will be recorded on each frame.

* * * * *